UNITED STATES PATENT OFFICE.

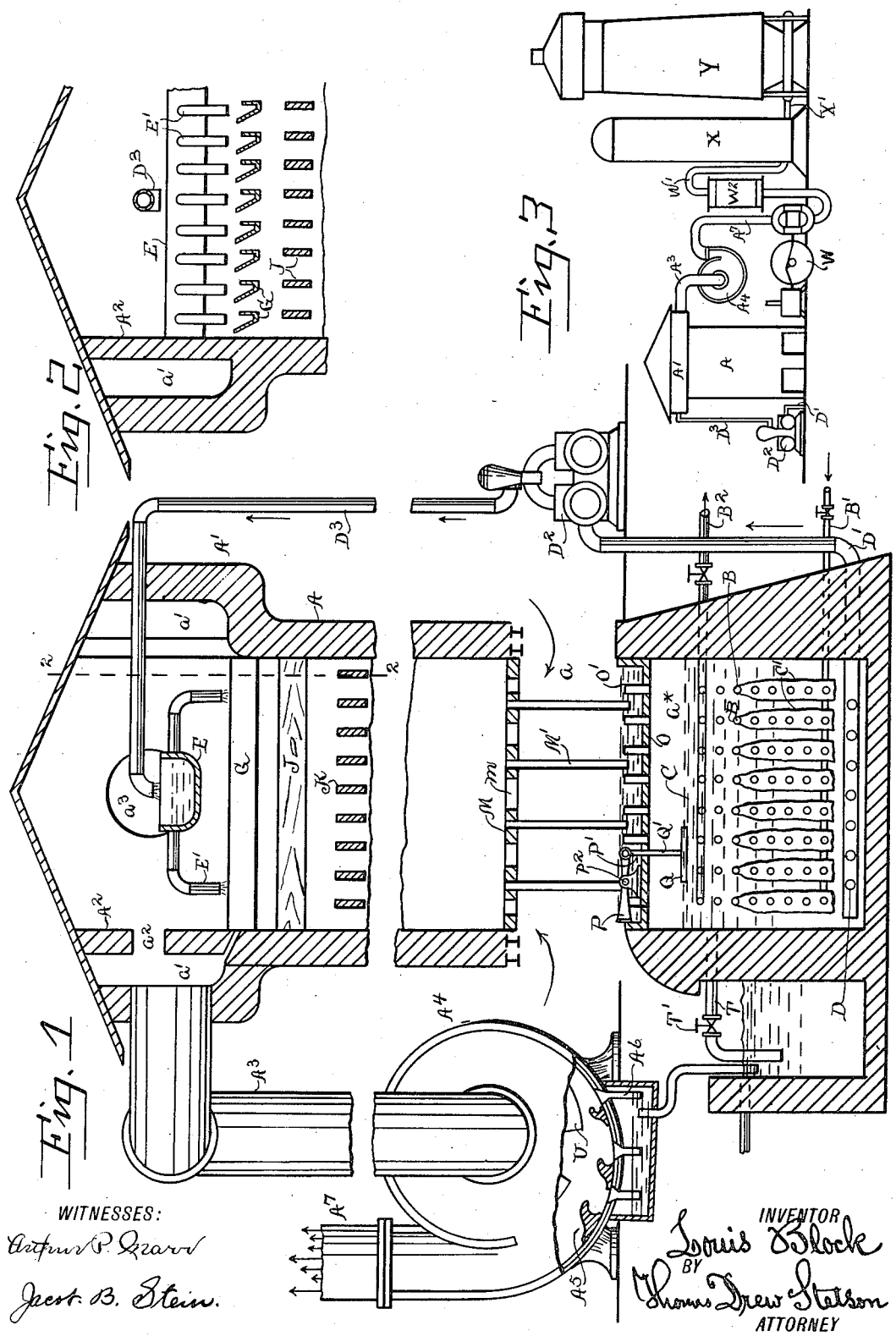

LOUIS BLOCK, OF MAMARONECK, NEW YORK.

MEANS FOR DRYING AIR.

961,710.

Specification of Letters Patent.  Patented June 14, 1910.

Application filed September 20, 1909.  Serial No. 518,679.

*To all whom it may concern:*

Be it known that I, LOUIS BLOCK, a citizen of the United States, residing at Mamaroneck, in the county of Westchester and State of New York, have invented a certain new and useful Improvement in Means for Drying Air, of which the following is a specification.

I will describe the improvement as applied to the treatment of air for use in blast furnaces for the reduction of ore to the condition of metallic iron. I can employ the commonly known blast furnace, preferably the modern examples working on a large scale.

The quantity of water wastefully carried by the air into the furnace has before been successfully reduced by lowering the temperature of the air and causing it to deposit its moisture. I adopt that plan and have discovered improved means for effecting and regulating such action, and have devised a special construction of a tower and associated parts, and an ice-pit or refrigerating-pit and connected mechanism constituting an apparatus for attaining this continuously and with a high degree of perfection.

I attach importance to the merely fuel-saving result of reducing the quantity of water in the air blown into the furnace, but there is far more importance in the qualitative effect of uniformity. When the air is uniform, and can be depended on as varying in nothing, the furnace men with their usual careful attention to choosing and weighing the rapidly recurring additions of ores and fluxes can make all the successive tappings practically uniform for indefinite periods. I arrange that ice in the dense transparent form, ordinarily so-called, more efficient for a given bulk than the spicular form,—frost,—shall be presented uniformly to a liberal supply of water which is used over and over, and that the ice shall increase when the cooling is below the mean, and decrease when it is above the mean. I so present such water to the incoming air as to certainly and effectually cool the air to a practically uniform temperature. My apparatus is intended to cool the air with certainty to near 32° Fah., and as the quantity of water thus circulating becomes excessive by the precipitation as the temperature of the air is lowered, my apparatus discharges all surplus while it is in its warmest condition. The invention thus not only serves as an automatic means of avoiding all small and rapidly recurring fluctuations in the temperature in a manner somewhat analogous to the function of a fly-wheel in regulating machinery, but also leads away the stream of surplus water without allowing it to descend into the refrigerating-pit and waste the ice there.

The following is what I consider a good means of carrying out the invention.

The accompanying drawings form a part of this specification.

Figure 1 is a central vertical section. Fig. 2 is a vertical section of a portion at right angles thereto, on the line 2—2 in Fig. 1, and Fig. 3 is a general side elevation in outline showing the same parts with the addition of the ordinary blowing engine, stove and blast furnace to which the air having its moisture reduced to a uniformly small amount is supplied.

Similar letters of reference indicate corresponding parts in all the figures where they occur.

A is a non-conducting casing or tower through which the air is passed. Its function is to inclose and support the parts which bring the air down to an ice-cold temperature by compelling the air and the water to move in extended contact,—the air moving upward and the water downward.

At a convenient level which I will designate as "the first story" the air is received radially in all directions at any temperature and with any degree of saturation with moisture which it may chance to possess as it comes from the external atmosphere. The large volume of air required for a blast furnace flows upward subjected to strongly cooling influences, and emerges at the top with its temperature reduced to a low degree, (I will assume it to be 33° Fah.).

I will designate as the first story and mark $a$ the chamber or space into which the air first enters. I will designate as "the refrigerating or ice-pit" and mark $a^*$ the considerable space below. In this important portion are distributed tiers of pipe marked B supplied with expanding ammonia, through a pipe B' and the ammonia expanded into the gaseous form and developing the required cold by its expansion flows out from the upper part of the ice pit through pipe $B^2$, the evaporated ammonia being again reduced to the liquid form by ordinary means not shown.

My apparatus is of the class in which the lowering of the temperature due to the evaporation of the ammonia is applied to the air indirectly. The strong cooling effect produced by the pipes B is developed in lowering the temperature of a sufficiently liberal quantity of water C, which I circulate by pumping up and distributing evenly and allowing to flow down.

The water in its descent through the tower is spread in a thin rapidly descending coating, on boards, absorbing the heat of the air which is flowing upward past it. The water is first received in a trough E at a high level, having lateral spouts E'. These deliver into over-flow troughs G, which interrupt and detain the water and allow it to be slowly discharged with uniformity, descending in rapidly succeeding drops or small streams upon a series of cypress boards J, placed parallel on edge. These boards are thus wet and allow the water to similarly drip from their lower edges across a little space and to wet another series K which may be similar boards shown as arranged at right angles to the boards J. In a sufficiently high tower there may be any number of successive series, down the surfaces of which the water flows, being very nearly ice-cold on the uppermost series and successively warmer and warmer on the lower parts, the water having all the way absorbed the heat of the ascending air, and usefully lowered it to a uniform temperature only a little above 32° Fah.

Above the first story $a$ is a horizontal partition M liberally perforated with two series of apertures, one series $m$ large and arranged to allow easy and uniform upward passage of the great volume of air, the other which may be much smaller, carrying tubes M' which extend downward nearly the whole depth of the space $a$. These tubes afford protected passages through which the water descends by gravity without being influenced by the violent motion of the air. The water which repeats the traverse indefinitely is in this warmest portion of each circuit still at a fairly low temperature, and the exterior of the tubes M' is colder than the air. The tower being practically a non-conductor of heat, these tubes M' and a layer of water below are the first cooling surfaces which the warm entering air meets.

To be reused continuously the water at each descent is distributed into the refrigerating-pit at a temperature which is only moderately cold as will be described farther on. Accumulating in contact with the coils B and sinking slowly downward between them, it rapidly parts with its remaining heat, giving it up to the ammonia in the coils. The water is preferably allowed to accumulate as shown to a little above the tops of the coils B, but if the water surface sinks lower, even if portions of the coils are above the water level and subjected to the descending wash or "rain" from above, they will serve well. If portions become coated sooner than others, the pipes thus coated become less able to receive heat rapidly from the exterior, and the other pipes or portions of pipes less thickly coated accumulate the ice more rapidly, thus tending to equalize the conditions on the several pipes, but it is not essential to my invention that the ice coating should be uniform. I propose that some or all the pipes of each tier shall freeze together, forming a series of parallel walls of ice C', leaving spaces between the tiers free from obstruction in which the water can freely sink.

The evaporation of the ammonia within each coil tends to increase the thickness of the ice on the exterior by extracting the caloric from such water until the freezing point of water is reached. The descending water tends to remove such coating by melting it. When the apparatus is in operation and variations occur, the thickness of the coating of ice will vary. When the temperature is for any brief period too low the ice coating will thicken and will extend farther up and will finally form into thick blocks or "plates." When the temperature is not low enough the attacks made on the ice by the bath of nearly ice-cold water reduce the thickness. Between these contending influences the water descending between the coils always reaches the bottom of the ice-pit at very nearly or exactly 32° Fah.

D are perforated pipes taking the water from all parts of the bottom of the refrigerating-pit, and leading it outward and upward in a single pipe D' under the action of a steam pump $D^2$, all as ordinarily except that the perforated pipes abstract the water from all parts of the bottom and that the pump and pipes outside are thickly clothed to maintain the low temperature of the water. It is forced up by the pump through a pipe $D^3$ and is delivered into the top of the tower in a constant stream at very nearly the same low temperature as obtains in the bottom of the refrigerating-pit.

O is a horizontal pan forming the bottom of the first story. Short tubes O' extending upward from well distributed points in this pan are of sufficient number and size to permit the discharge and further descent of all the water, but it can only thus descend by maintaining its surface at or above the level of the tops of these tubes. The descending water thus detained a few inches deep on the pan O presents a cooling surface at its top to the torrent of air entering from all sides above it.

Instead of losing any of the water pumped up, there is an excess, due to the contribution thereto which is made by the ascending air as its temperature is lowered during its ascent. Cold air holds less water than warm. The air soon attains a saturated condition. After such state is reached the air rising past the still colder water surfaces above not only continues to be lowered in temperature, but also to deposit water. Such deposit adds to the quantity previously in the circuit. This addition varies. It is thus important to provide for a greatly variable overflow.

I arrange to take away the surplus as the water is distributed downward in the tower, and provide means for effecting this so as to take it away in its warmest condition, as it descends through the warmest part of its course and accumulates in the pan O. This peculiarity is important by reducing the cooling function required of the ammonia.

P is a horizontal gate carried on a lever P' which turns on a fixed pin $P^2$ and is turned by a rod Q' which extends down through an easy-fitting hole in the pan O, and connects to a float Q. The latter rises and sinks with the water level in the refrigerating-pit. When the water in the refrigerating-pit sinks, the sinking of the float Q raises the gate P and restrains the discharge of warm water, thus raising the water level in the pan O, causing more to descend through the short pipes O' and thus to raise the level again in the refrigerating-pit. It will be observed the discharge from the pan O is usefully regulated not by the height of the water in such pan, but by the height of the water in the refrigerating-pit below.

T is a separate waste pipe controlled by the attendant by means of a cock T'. This is only to be used in emergencies. Ordinarily the cock T' is closed, and the float Q which may simply be a piece of board lying flat in the cold water with room to rise and sink above the coils B, shifts the gate P so as to always discharge just enough.

The pipes B in which the intense cold is induced are arranged in tiers. After the apparatus has been working a short time dense ice C' forms on them as shown, and thenceforward such ice serves as a means of insuring that the water is always received by the pump at 32° Fah. When the water tends to be delivered too warm, some of the ice C' melts, this result being mainly near the top of each tier, giving the taper form to the ice approximately as shown in the figure. When the cold is temporarily in excess, the ice becomes thicker and also the height of the masses of ice C' is increased. The attendant regulates the supply of ammonia, or it may be regulated by any suitable automatic device, to keep that important element right, and the ice C' presenting a large surface favorably arranged, serves to the cooling as a fly-wheel serves to the velocity of a machine by smoothing down all slight irregularities, and gives uniformly low temperature in the water drawn out and forced up by the pump. The arrangement insures that the water in the refrigerating-pit, ice-cold at the bottom and but little warmer in the successive layers above, is kept at a practically uniform level under all conditions, and that all the surplus due to additions of water which has been extracted from the air is led away in its warmest condition, avoiding the loss which would be experienced if it were allowed to sink into the refrigerating-pit.

U is a fan blower driven preferably by the same engine which impels the pump $D^2$ so as to be quickened and slowed in unison therewith. It performs the double function of inducing a partial vacuum in the upper portion of the tower, and thus drawing in the air radially from all sides at the bottom and passing it up in opposition to the descending movement of the water in the tower, and also of inducing a strong centrifugal force which throws all suspended watery particles out against the inclosing casing. The bottom of the fan casing $A^4$ is equipped with several successively increased cross dams $A^5$, preferably three as shown, which arrest any entrained water which may be moving along the inner surfaces in obedience to the strong friction imposed by the rapidly moving air, and allows such water to descend through the pipes $A^6$ and be led away. The pipes are immersed at their delivery ends to prevent the strongly fanned air from escaping.

At the earlier stage of the descent of the water, but later stage of the ascent and cooling of the air, the great volume of air is caused to move outward in divergent directions at the top of the tower and into an annular passage $a'$ in the enlargement A'. In so moving it flows through different sized apertures in a crescent shaped wall $A^2$. On the opposite side from the final delivery passage the wall is entirely omitted,—the discharge is free. Coinciding with the final delivery is the smallest aperture $a^2$. At the intermediate position on each side is an aperture $a^3$ of intermediate size. The result is to secure a practical uniformity in the drawing out of the air on all sides of the tower at the top. The annular passage and unequally apertured wall, by inducing uniformity in the radial escape of the air, tends to make the cooling provisions equally efficient at the top at all sides of the tower. The effect is analogous to that of the uniform radial induction at the bottom, tending to make the cooling provisions at all sides equal. The air is led from the annular passage A' through the passage $A^3$ to the fan casing A⁴ from whence after its entrained water is arrested and taken out it is led by the casing A⁷, to W, the ordinary pump blower.

This powerful machine receives the uniformly cold air, and compresses it to the tension required to enter the usual air-heating stove and be passed into the furnace. W' is the connection of this blower W to the stove and X' the passage from the stove X to the blast furnace Y, which respectively perform their usual functions.

Modifications may be made without departing from the principle or sacrificing the advantages of the invention. Parts may be omitted or added.

The blowing may be compounded, the last portion of the tension being given by an additional blower indicated by the rectangle W².

I may circulate cold brine or other cooling medium through the cooling coils B instead of evaporating ammonia therein.

I propose sometimes to work with the water-surface in the refrigerating-pit below the uppermost of the cold pipes B. In such case the float Q will be of a form to move easily up and down in the liberal space between the pipes B, and the rod Q' must be correspondingly longer.

I propose ordinarily to make the tower about 40 feet high, but this may be varied. It may be circular or of any desired horizontal section, but I prefer to have it rectangular. Various material may be used—I propose usually to employ reinforced concrete and galvanized iron.

I may leave out the exhaust fan and depend upon the aspiration of the blowing engine for drawing the air into the tower and upward through the descending cold water.

I may do away with the exhaust fan drive, but still let all the air pass through the fan and utilize the centrifugal force for separating any entrained water from the air which it may contain.

Some of the features set forth herein are claimed in a separate application filed by me, October 26, 1908, Serial Number 459,495.

I claim as my invention:

1. The combination with the blowing mechanism of a blast furnace of air-treating apparatus comprising refrigerating pipes, an inclosing pit, provisions for taking water therefrom in a cold state and presenting it with a motion in one direction to a current of air in the opposite direction so as to attain counter-current heat exchanging, and provisions for returning such water and repeating.

2. Air-treating apparatus comprising refrigerating pipes, an inclosing pit, provisions for taking water therefrom in a cold state and presenting such water with a downward motion to an upward current of air so as to attain a large measure of heat exchanging, provisions for returning such water to the pit to be again cooled therein and delivered in a uniformly cold condition to be again circulated, and provisions for taking away the surplus in the returning water before it reaches the refrigerating-pit.

3. Air-treating apparatus comprising refrigerating pipes arranged in vertical series, an inclosing pit, provisions for taking water therefrom in a cold state and presenting thereto an upward current of air, provisions for returning such water to the pit to be cooled therein and delivered from a low point in a uniformly cold condition, and provisions for taking away surplus water by a gate P and float Q, the latter means arranged for automatically attaining the removal of a just sufficient amount of the liquid without allowing it to warm the refrigerating-pit.

4. Air-treating apparatus comprising refrigerating pipes arranged in vertical series, an inclosing refrigerating-pit, provisions for taking a liquid therefrom in a cold state and presenting thereto an ascending current of air, provisions for returning such liquid to the pit to be cooled therein and delivered from a low point in a uniformly cold condition, and provisions for taking away surplus liquid by a pipe T and cock T' regulated by hand, and also by a gate P and float Q, the latter means arranged for automatically attaining the removal of a just sufficient amount of the liquid without allowing it to warm the refrigerating-pit.

5. Air-treating apparatus comprising refrigerating pipes, an inclosing pit, provisions for taking water uniformly cold from all parts of the bottom of such refrigerating-pit, provisions for spreading such water, and uniformly delaying its descent by its friction, provisions for presenting an ascending current of air thereto, and delivering such air radially into an annular space at the top and leading it thence to a blower.

6. Air-treating apparatus comprising refrigerating pipes, an inclosing refrigerating-pit or tank, provisions for taking water therefrom in a uniformly cold state and presenting an ascending current of air thereto, provisions for showering the water in a tower in such presentation, provisions by the cross-pieces J and K and the vessels E and pan O for delaying the descent, and provisions for removing the surplus water before allowing it to affect the refrigerating-pit.

7. A cooling tower, provisions for distributing cold water to descend therein, and provisions for collecting such water after each descent in a pit below, the latter having cooling coils arranged in tiers so that ice of varying thickness may form on each side of each coil, means for taking away the surplus water in the warmest condition without allowing it to be brought in contact with the contents of the refrigerating-pit, means for carrying the coldest water from the bottom of said pit to the top of the tower, and means for passing the air upward through the tower against the descending motion of the water.

Signed at New York this 15th day of September 1909.

LOUIS BLOCK.

Witnesses:
HERMAN MEYER,
GRACE VOLK.